(12) United States Patent
Wilkes

(10) Patent No.: US 7,039,765 B1
(45) Date of Patent: May 2, 2006

(54) TECHNIQUES FOR CACHE MEMORY MANAGEMENT USING READ AND WRITE OPERATIONS

(75) Inventor: John Wilkes, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 330 days.

(21) Appl. No.: 10/324,226

(22) Filed: Dec. 19, 2002

(51) Int. Cl.
*G06F 12/00* (2006.01)

(52) U.S. Cl. .................... 711/133; 711/113; 711/122; 711/141

(58) Field of Classification Search ................ 711/113, 711/122, 133
See application file for complete search history.

(56) References Cited

U.S. PATENT DOCUMENTS

| | | | |
|---|---|---|---|
| 4,603,380 A | 7/1986 | Easton et al. | |
| 5,283,884 A | 2/1994 | Menon et al. | |
| 5,353,428 A | 10/1994 | Shibata | |
| 5,542,066 A | 7/1996 | Mattson et al. | |
| 5,600,817 A | 2/1997 | Macon, Jr. et al. | |
| 5,606,688 A | 2/1997 | McNutt et al. | |
| 5,933,853 A | 8/1999 | Takagi | |
| 6,253,290 B1 | 6/2001 | Nakamoto | |
| 6,324,632 B1 | 11/2001 | McIntosh-Smith | |

OTHER PUBLICATIONS

U.S. Appl. No. 09/641,383 (Wilkes et al.), filed Aug. 17, 2000.*

Wong, Theodore M., Granger, Gregory R., Wilkes, John; My cache or yours? Making storage more exclusive; SCS Technical Report Collection; School of Computer Science, Carnegie Mellon University, Pittsburgh, PA, Nov. 2000.

Wong, Theodore M., Wilkes, John; My cache or yours? Making storage more exclusive; Proc. of the USENIX Annual Technical Conference; pp. 161-175, Jun. 10-15, 2002, Monterey, CA; USENIX, Berkeley, CA.

Franklin, Michael J., Carey, Michael J., Livny, Miron; Gl bal M m ry Management in Cli nt-Serv r DBMS Architectur s; Proceeding of the 18th VLDB Conf rence, Aug. 23-27, 1992 Vancouver, British Columbia, Canada; Ed. Li-Yan -Yuan, Morgan Kaufmann-Elsevier Science, San Francisco, CA.

(Continued)

*Primary Examiner*—Reginald G. Bragdon

(57) ABSTRACT

Techniques for cache memory management using read and write operations. A read or a write operation to a storage system is initiated for data that is held in a host system cache, but is ready to be evicted from the host system cache. In response to the read operation, the data stored in a mass-storage medium of the storage system is copied to the storage system cache memory in preparation for transfer to the host system. However, the read operation is initiated when the data is not presently needed by the host system. In response to the write operation, the data stored in the host system cache is copied to the storage system cache in preparation for transfer to the mass-storage medium. However, the write operation is initiated when the data is already stored in the mass-storage medium. Then, the data is evicted from the host system cache. This results in exclusivity in that the data becomes present in the storage system cache, but is no longer present in the host system cache.

48 Claims, 9 Drawing Sheets

OTHER PUBLICATIONS

Cao, Pei, Felten, Edward W., Li, Kai; Application-Controlled File Caching Policies; USENIX Summer 1994 Technical Conference, Jun. 6-10, 1994, Boston, MA, USENIX, Berkeley, CA.

* cited by examiner

US 7,039,765 B1

TECHNIQUES FOR CACHE MEMORY MANAGEMENT USING READ AND WRITE OPERATIONS

FIELD OF THE INVENTION

The present invention relates to the field of computer systems. More particularly, the present invention relates to cache memory in computer systems.

BACKGROUND OF THE INVENTION

A typical computer system includes one or more host systems and one or more storage systems. A storage system typically provides relatively large-scale, non-volatile storage of data which may be accessed by a host system. A host system typically accesses a storage system by performing write and read operations to and from the storage system via a communication path or network between the host and storage systems.

A typical host system includes a host processor and a host cache. The host processor executes application programs that require access to data and that may also modify the data or generate new data. The host cache temporarily holds data for use by the host processor. Because communication delays are reduced, the host processor can access the information held in the host cache more quickly than data held in the storage system. Accordingly, when the host processor requires access to data, the host cache is first checked to determine whether the requested data is present in the host cache. If so, the data can be retrieved more quickly, improving system performance. If the data is not present in the host cache, it can be retrieved from the storage system.

In addition, the storage system commonly includes a mass-storage medium, such as a hard disk or a disk array, and a storage system cache. A typical storage system cache temporarily holds information obtained from the mass-storage medium or information that is to be stored in the mass-storage medium. Because access times for the storage system cache are typically less than access times for the mass-storage medium, information held in the storage system cache can be accessed by the host system more quickly than data held in the mass-storage medium. Accordingly, where requested data is to be retrieved from the storage system, the storage system cache is first checked to determine whether the requested data is present in the storage system cache. If so, the data can be retrieved more quickly than from the mass-storage medium. If the data is not present in the storage system cache, it can be retrieved from the mass-storage medium.

In addition, the storage system cache typically serves as a buffer for write operations. More particularly, where the host system sends data to be stored by the storage system, the data is first received into the storage system cache and then the data is written to the mass-storage medium.

The host cache and storage system cache are typically managed independently and in a manner designed to increase the likelihood that each will contain the information accessed by the host processor. As a consequence, duplicate information often accumulates in both the host cache and the storage system cache. Unfortunately, such duplication of information reduces the effective storage space of the host and storage system caches. Such duplication is wasteful because of the relatively high cost of implementing caches in the host system and the storage systems.

What is needed is a technique for more efficiently utilizing cache memories. It is to these ends that the present invention is directed.

SUMMARY OF THE INVENTION

The present invention is directed toward techniques for cache memory management using read and write operations. In one aspect, a computer system includes a primary cache memory, a secondary cache memory and a third storage medium. Data is stored in the primary cache memory and a copy of the data is stored in the third storage medium. A read operation to the third storage medium is initiated after (or while) the data is stored in the primary cache memory thereby placing a second copy of the data into the secondary cache. In another aspect, prior to evicting the data stored from the primary cache memory, a write operation to the third storage medium is initiated thereby placing a second copy of the data into the secondary cache memory. Then, the data is evicted from the primary cache memory. This results in exclusivity in that the data becomes present in the storage system cache, but is no longer present in the host system cache.

The primary cache memory may be included in a host computer system, while the secondary cache memory and the third storage may be included in a storage system. The third storage medium may include mass-storage such as one or more hard disks. One or more of an additional host computer and an additional storage system may be included where the host computer system(s) are coupled to the storage system(s) via a communication network.

The data to be stored exclusively may be selected according to whether the data includes metadata or according to whether the data is a first block of data for a file. A performance parameter (e.g., mean access time or cache miss rate) may be measured, in which case, storing data exclusively may be performed selectively in response to the measured performance parameter. A proportion of data blocks that are stored exclusively may be changed in response to the measured performance parameter. Further, storing data exclusively may cease in response to the measured performance parameter.

Where the operation is a read operation, the second copy of data may be copied to the primary cache or copying the second copy of the data to the primary cache may be avoided by aborting the read operation. Also, the data may be evicted from the primary cache before initiating the read operation. Alternately, the data may be evicted after initiating the read operation. Wherein the operation is a write operation, the second copy of the data may be copied to the third storage medium or copying the second copy of the data to the third storage medium may be avoided.

DETAILED DESCRIPTION OF A PREFERRED EMBODIMENT

Figure 1:
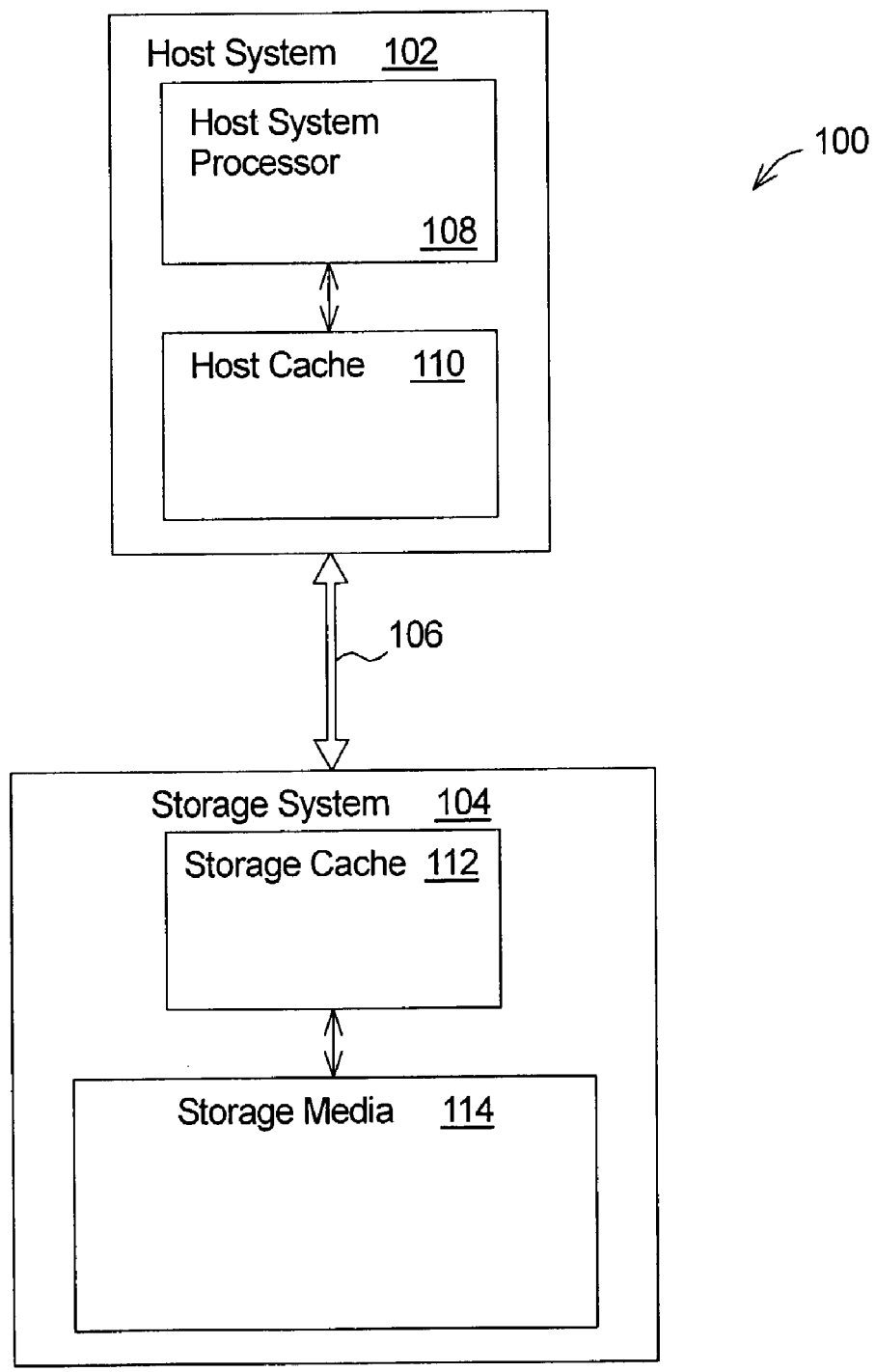
FIG. 1 illustrates a computer system in which the present invention may be implemented.

The present invention provides techniques for cache memory management using read and write operations. The invention is applicable to any computer system in which multiple cache memory levels are provided. For example, a host system having a host cache memory may be coupled to a storage system having a storage system cache memory. The host cache memory may be considered a primary cache since it has the lowest access latency from the point-of-view of the host processor. The storage system cache memory may be considered a secondary cache since it will often have higher access latency from the point of view of the host system. This additional latency is due to the host system and storage system typically being separated by a communication link (e.g., a bus) or a network (e.g., a SAN, or Storage Area Network).

While the present invention is described in the context of one or more host systems coupled to one or more storage systems, it will be apparent that the invention can be applied to any computer system in which multiple levels of cache memory are provided. For example, the cache memory management techniques described herein may be applied to processor caches. In such a system, an L1 (level-one) memory may function as the primary cache, L2 (level-two) memory may function as the secondary cache, and main memory may function as a third level of memory.

The present invention provides for efficient use of cache memories by providing that some data is stored exclusively, in which one or more data objects (e.g., a data block, a file or portion thereof) are stored in the primary cache or in the secondary cache, but not in both. However, other data may be stored non-exclusively, in which the same data is stored in multiple cache levels. By storing at least some data exclusively, this increases the aggregate amount of data that can be stored in the cache memories. By increasing the aggregate amount of cached data, this tends use cache memory space more efficiently. Further, this can reduce the aggregate cache miss rate (i.e. the fraction of requests that miss all caches) and, thus, can reduce the mean request latency. As a result, performance can be improved.

Exclusive caching in accordance with the present invention is accomplished through use of read and write operations in previously unknown ways. The read and write operations themselves can be conventional (e.g., as part of the standard set of SCSI commands). However, as explained herein, they are employed in an inventive manner.

In one aspect, a read operation to the storage system is initiated for data that is held in the host system cache, but is ready to be evicted from the host system cache. In response to the read operation, the data stored in a third storage medium (e.g., a mass storage medium of the storage system) is copied to the storage system cache memory in preparation for transfer to the host system. However, the read operation is initiated when the data is not presently needed by the host system. Thus, the read operation may be aborted before the data is transferred from the storage system to the host. Then, the data is evicted from the host system cache. This results in exclusivity because the data becomes present in the storage system cache, but is no longer present in the host system cache.

In another aspect, a write operation to the storage system is initiated for data that is held in the host system cache, is ready to be evicted from the host system cache, but has not been modified there (i.e., it is "clean"). The data is also stored in a third storage medium (e.g., a mass-storage medium of the storage system). In response to the write operation, the data stored in the host system cache is copied to the storage system cache in preparation for transfer to the mass-storage medium. However, the write operation is initiated when the data is already stored in the third storage medium. Then, the data is evicted from the host system cache. This results in exclusivity because the data becomes present in the storage system cache, but is no longer present in the host system cache.

Exclusive data storage in accordance with the present invention may be used for all data ready for eviction or only for selected data. For example, the exclusive storage techniques of the invention may be used only for metadata (e.g., data included in a file directory). As another example, the first block of data for each file may be selected for storage exclusively, while remaining blocks of data may be managed in a conventional manner.

Further, exclusive caching in accordance with the present invention may be employed adaptively. More particularly, a performance parameter, such as mean memory access time for read operations or the cache miss rate (e.g., the fraction of requests that miss all caches) may be monitored. Use of the exclusive caching techniques of the invention may then be selectively employed based on the measured performance parameter. For example, a proportion of data blocks that are cached exclusively may be gradually increased or decreased in an effort to maximize measured performance. As another example, exclusive caching in accordance with the invention may be disabled entirely (by ceasing to select blocks to be stored exclusively) if it does not improve the measured performance parameter. Thereafter, the technique may be periodically retried for certain blocks of data to determine whether performance is improved and if so, the technique may be re-enabled, e.g., for a pre-selected period of time.

FIG. 1 illustrates a computer system in which the present invention may be implemented. A host system 102 and a storage system 104 communicate via a communication path 106. The host system 102 includes a host processor 108 and a host cache 110. The storage system 104 includes storage system cache 112 and a storage media 114.

The host system 102 may be any type of system which generates or modifies data. For example, the host system 102 may include a personal computer or workstation that runs one or more application programs, such as a word-processing application. In addition, the host system 102 manages the host cache 110. This may include implementing any one or more of known replacement policies for selecting data blocks to be evicted from the host cache 110. For example, the host system 102 may implement a least-recently used (LRU) replacement policy, a most-recently used (MRU) replacement policy, a most-frequently replaced (MFR) replacement policy, or variations thereof, for the host cache 110. It will be apparent that these are only examples of suitable replacement policies and that others may be employed. The host cache 110 may be any type of memory system used to store data for faster access by the host processor 108.

In addition, the storage system 104 may be any type of storage system that is capable of holding data blocks for access by the host system 102 and that includes a storage system cache 112. In one embodiment, the storage media 114 includes a hard disk drive, though the storage media may include a disk array, or other type of storage media, such as solid-state memory, magnetic tape or optical media; it may also be a lower-level cache memory, which may, in turn, be fronting still lower-levels in a storage hierarchy. The storage system 104 may perform the functions of a storage server for more than one host system that access the storage system using any one or more known client-server communication protocols. In which case, the communication path 106 may be part of a communication network.

The host system 102 obtains information from the storage system 104 by performing read operations via the communication path 106 and transfers information to the storage system 104 by performing write operations via the communication path 106. In addition, the host system 102 performs cache memory management by performing read and/or write operations via the communication path 106.

In one embodiment, the host cache 110 and the storage system cache 112 are organized into sets of information. These sets of information may be referred to as data blocks, cache blocks, cache lines or data lines. Each data block is associated with a particular memory address whether the data block is stored in a cache or other storage media. It is usual, although not required, that there is just one address associated with each "clean" data block in the storage system cache 112; high-availability storage systems may keep two or more copies of data blocks in separate parts of the storage system cache 112, in order to reduce the risk of losing data.

When host system 102 requires access to data, it may first check the host cache 110 to determine whether the requested data is contained therein. If the requested data is present in the host cache 110, the data may be retrieved from the host cache 110. If the data referenced in the read operation is not held in the host cache 110, the host system 102 may then obtain the data from the storage system 104 via the communication path 106.

In response to a read operation by the host system 102, the storage system 104 may first check the storage cache 112 to determine whether the requested data is contained therein. If the requested data is present in the storage cache 112, the data may be retrieved from the storage cache 112 and communicated to the host system 102. This generally includes copying the data to the storage system cache 112 so that the data will be more readily available if needed again.

If the requested data is not present in the storage cache 112, the data may be obtained from the storage media 114. More particularly, where the data is not present in the storage cache 112, it may be copied from the storage media 114 to the host system 102. This may include copying the data to the storage cache 112 and/or to the host cache 110 so that the data will be more readily available if needed again. In one aspect, the system 100 may perform read-ahead operations, in which data at memory locations which follow the requested data is also retrieved and made ready in the host cache 110 and/or storage cache 112 in case it is requested.

When the host system 102 modifies previously requested data (or if the host system 102 generates new data), it may be desired to store the data in the storage system 106. Newly-generated or recently-modified data may be stored at the host cache 110 and marked as "dirty" to indicate the data has not yet been forwarded to the storage system 104.

To forward the "dirty" data at the storage system 104, the host system 102 issues a write request to the storage system 104 and forwards the data to the storage system 104. In response, the storage system 104 receives the data into the storage cache 112. In addition, the data may be immediately stored in the storage media 114 or stored in the storage media 114 after a delay. Once the data has been forwarded to the storage system 104, the host system 102 may mark the data as "clean."

Where data is transferred into the host cache 110 or into the storage cache 112, this will generally require eviction of other data in order to make room for the new data being transferred in. Any conventional scheme for determining which data to evict may be used. For example, least-recently accessed data may be evicted. Data is evicted by making its memory locations available to be overwritten by the new data.

Figure 2:
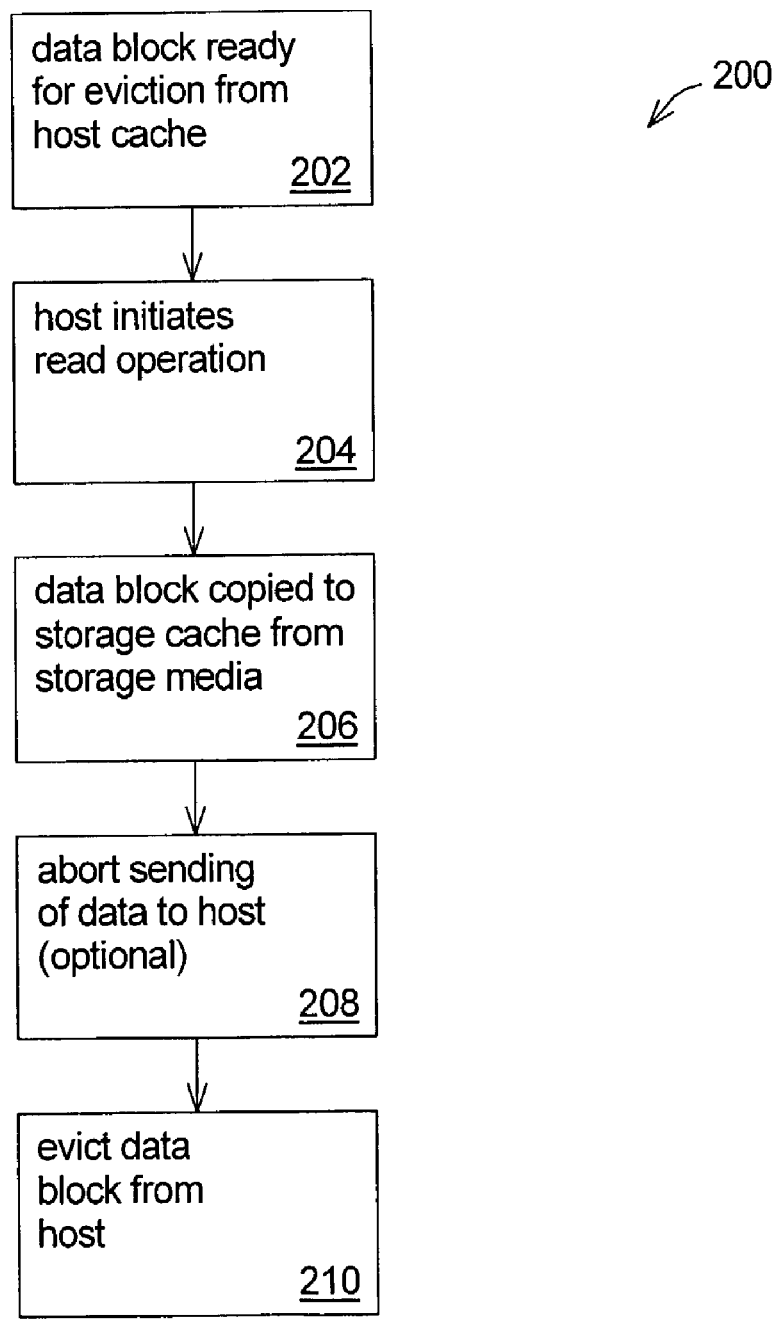
FIG. 2 illustrates a flow diagram for cache memory management using a read operation in accordance with an aspect of the present invention.
Figure 3:
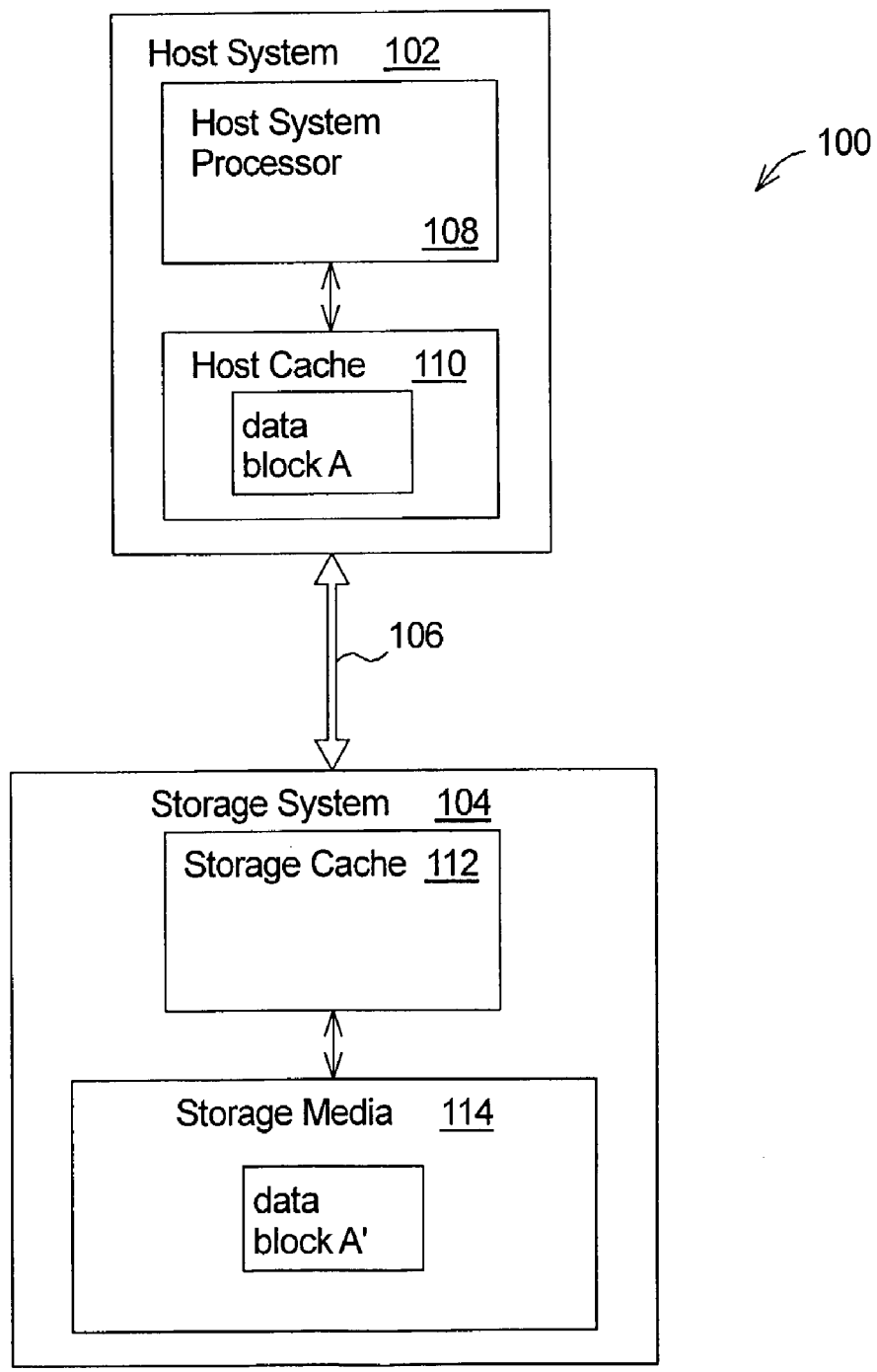
FIG. 3 illustrates the computer system including a data block ready for eviction from a primary cache memory in accordance with an aspect the present invention.

FIG. 2 illustrates flow diagram 200 for cache memory management using a read operation in accordance with an aspect of the present invention. Program flow may begin at step 202 when a data block is ready for eviction from the host cache 110. This is shown in FIG. 3 in which a data block A is ready for eviction from the host cache memory 110 of the computer system 100 of FIG. 1. FIG. 3 also shows that a duplicate of the data block A is stored at the storage system media 114. The duplicate block is designated as data block A' (data block A-primed). Because the data block A' is present in the storage system 104, the data block A is "clean" and, thus, can be evicted from the host cache 110 without risk of losing the data.

In step 204, the host system 102 initiates a read operation to the storage system 104 for the data block A'. Because the identical data block A is already present in the host cache 110, the requested data is not needed by the host system 102. Accordingly, the read operation is issued under unconventional circumstances.

Figure 4:
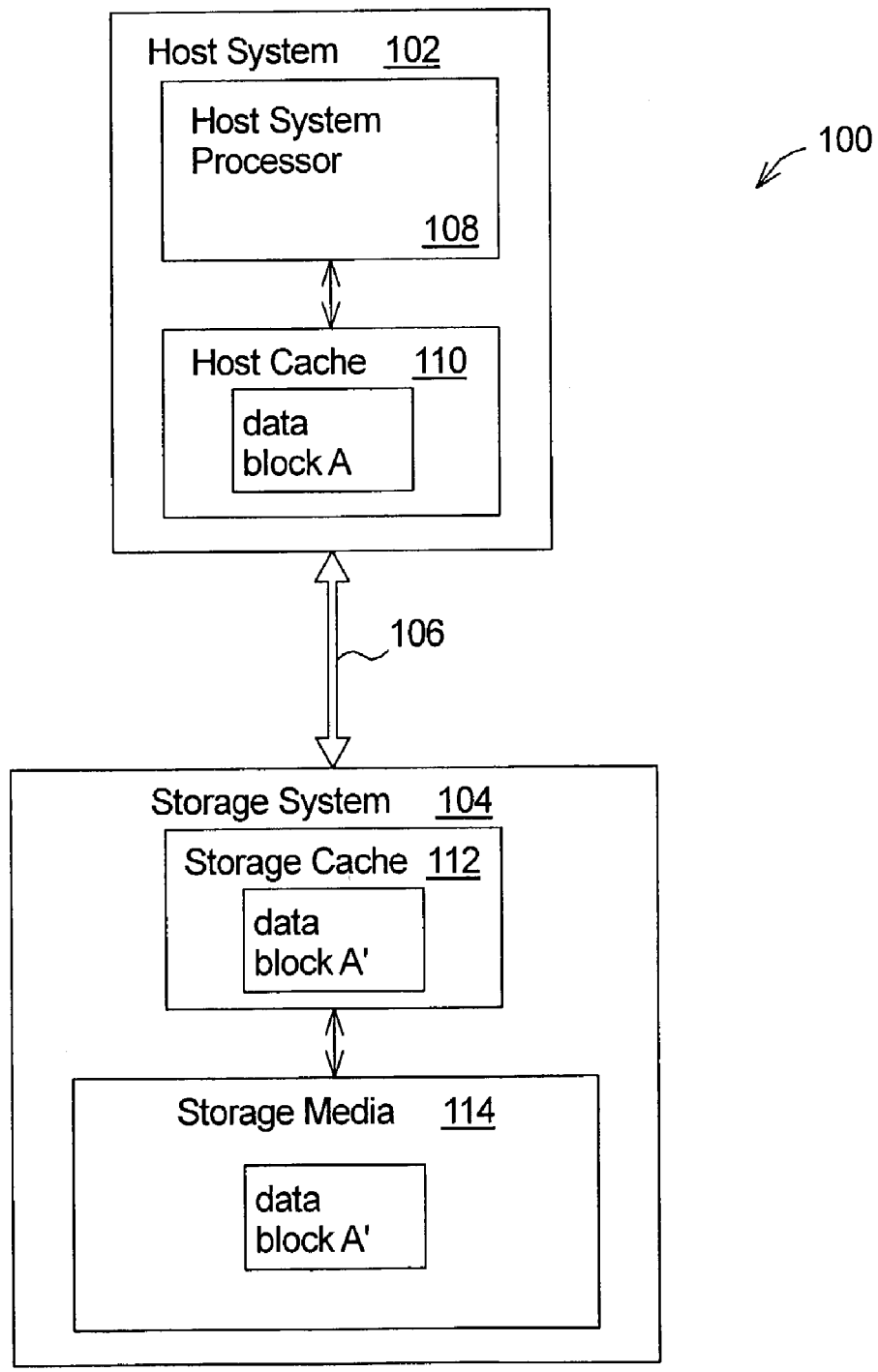
FIG. 4 illustrates the computer system in which the data block has been copied to a secondary cache memory using the read operation in accordance with an aspect of the present invention.

In step 206, in response to the read operation issued in step 204, the storage system 104 copies the data block A' from the storage media 114 to the storage cache 112. FIG. 4 shows the computer system 100 after performance of step 206, in which the data block A' is present in the storage media 114 and in the storage cache 112.

Next, the read operation may include forwarding the data block A' to the host system 102. As mentioned, however, the data block A' is not needed by the host system 102 since the data block A is present in the host cache 110 (and is ready for eviction from the host cache 110). Accordingly, the data block A' forwarded to the host system 102 may be ignored or discarded by the host system 102. Alternately, the read operation may be aborted in step 208. This may be accomplished, for example, by the host system 102 signaling the storage system 104 to abort the transaction in response to the storage system 104 signaling the host system 102 that the requested data block A' is ready for forwarding to the host system 102. Aborting the read operation is preferred as this will tend to reduce the amount of the data traffic over the communication path 106.

Figure 5:
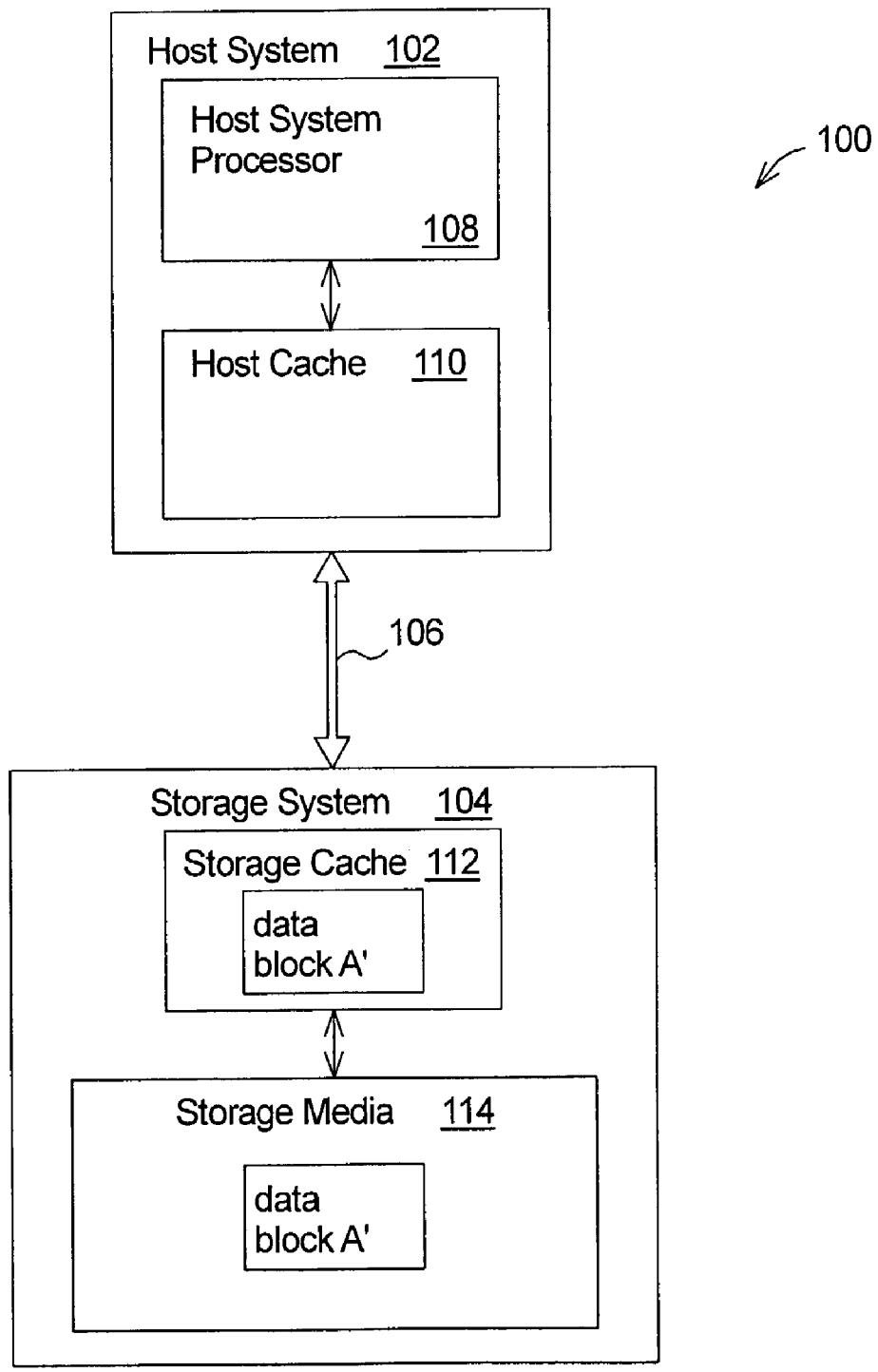
FIG. 5 illustrates the computer system after eviction of the data block from the primary cache memory in accordance with an aspect of the present invention.

In step 210, the data block A is evicted from the host system cache 110. FIG. 5 illustrates the computer system 100 of FIG. 1 after eviction of the data block A from the host cache memory 110. As shown in FIG. 5, the data block A' is present in the storage cache 112, but a duplicate of the data is no longer present in the host cache 110. Accordingly, the data block A' is now exclusively cached by the storage cache 112. Thus, a technique has been described for cache memory management using a read operation.

As described above, the data block A is held in the host cache 110 until the read request has been issued to the storage system 104. This is not necessary: the host may evict data block A from host cache 110 at any point in the proceedings. Indeed, the read request can be deliberately delayed to some future time, if so desired (e.g., if the bandwidth on link 106 is more or less fully occupied, or if the host system 102 or storage system 104 are busy).

Figure 6:
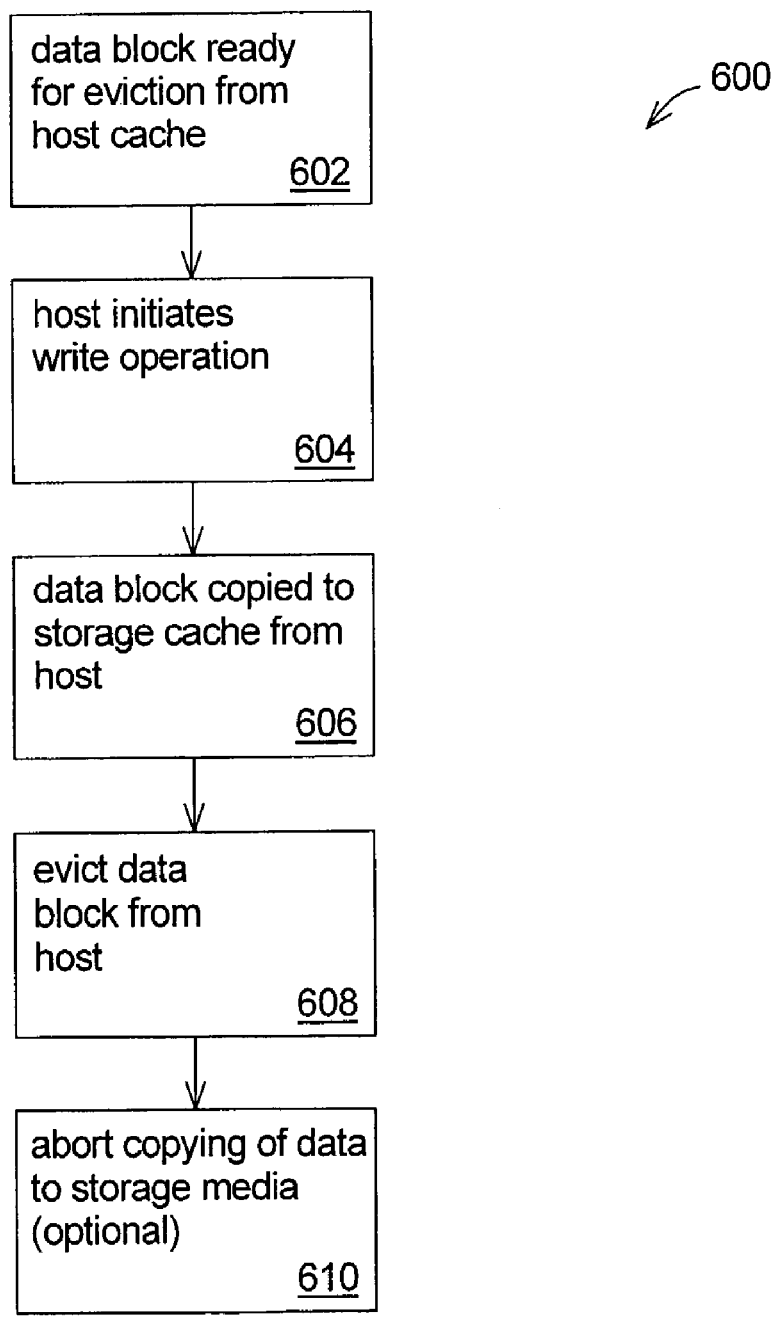
FIG. 6 illustrates a flow diagram for cache memory management using a write operation in accordance with an aspect of the present invention.

FIG. 6 illustrates a flow diagram 600 for cache memory management using a write operation in accordance with an aspect of the present invention. Program flow may begin at step 602 when a data block is ready for eviction from the host cache 110. This is shown in FIG. 3 in which a data block A is ready for eviction from the host cache memory 110 of the computer system 100 of FIG. 1. FIG. 3 also shows that a duplicate of the data block A is stored at the storage system media 114. The duplicate block is designated as data block A' (data block A-primed). Because the data block A' is present in the storage system 104, the data block A is "clean" and, thus, can be evicted from the host cache 110 without risk of losing the data.

In step 604, the host system 102 initiates a write operation to the storage system 104 for the data block A. Because the identical data block A' is already present in the storage system 104 (in the storage media 114), the writing of the data is not needed for storing the data block in the storage media 114. Accordingly, the write operation is issued under unconventional circumstances.

Figure 7:
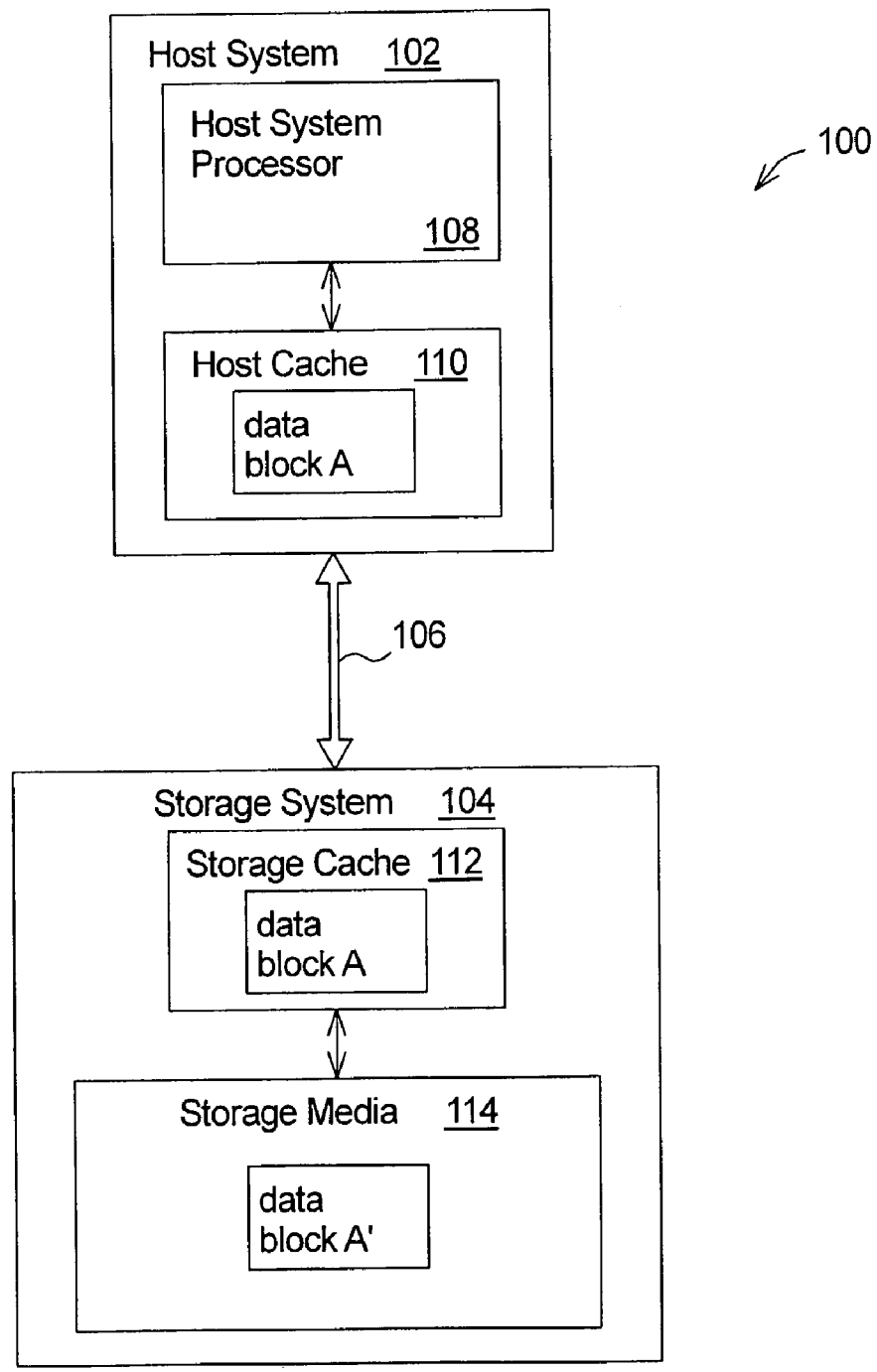
FIG. 7 illustrates the computer system in which the data block has been copied to a secondary cache memory using the write operation in accordance with an aspect of the present invention.

In step 606, in response to the write operation issued in step 604, the storage system 104 copies the data block A from the host system 102 to the storage cache 112. FIG. 7 shows the computer system 100 after performance of step 606, in which the data block A is present in the host system 102 and in the storage cache 112.

Figure 8:
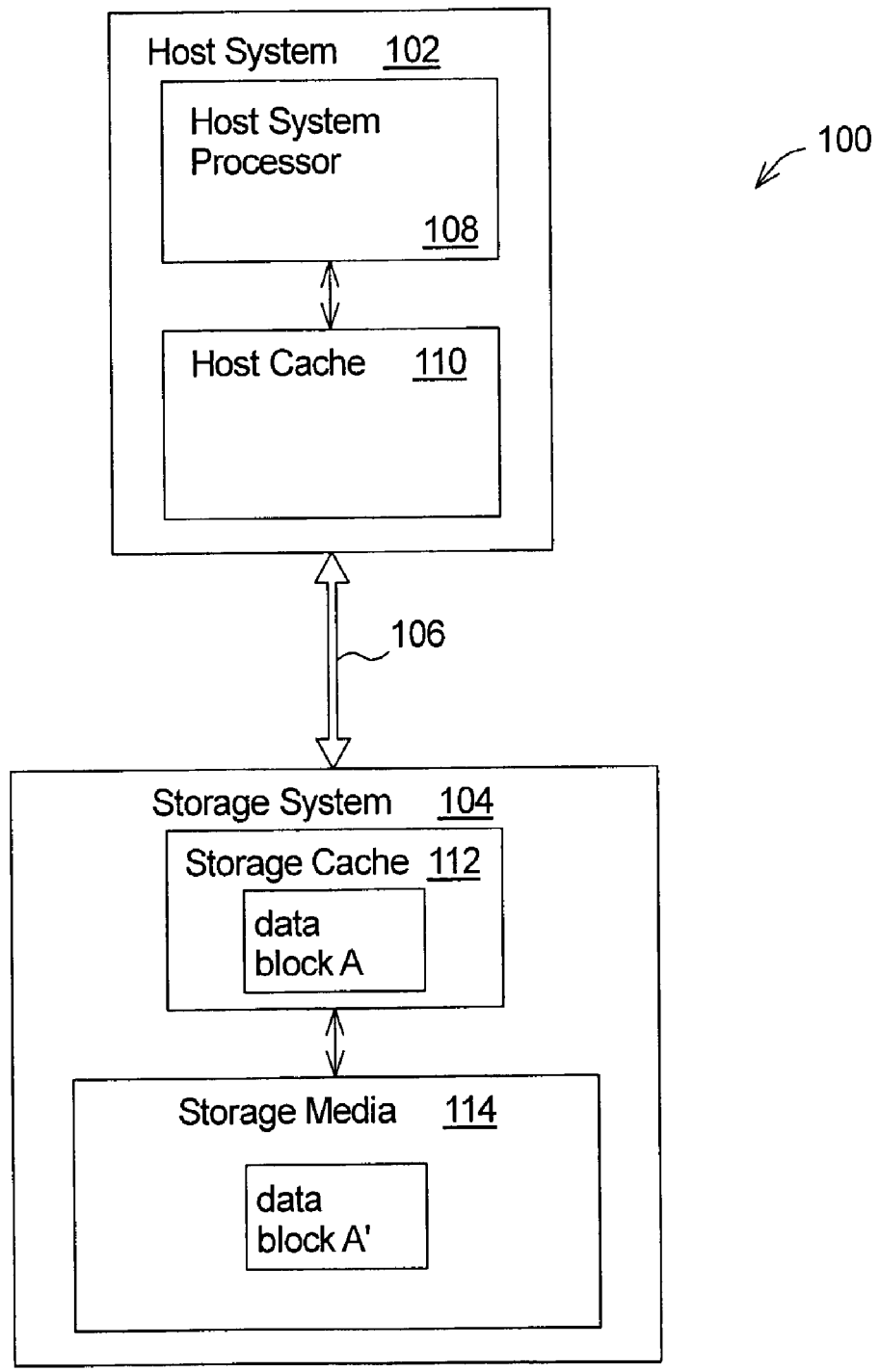
FIG. 8 illustrates the computer system after eviction of the data block from the primary cache memory in accordance with an aspect of the present invention.

In step 608, the data block A is evicted from the host system cache 110. FIG. 8 illustrates the computer system 100 of FIG. 1 after eviction of the data block A from the host cache memory 110. As shown in FIG. 8, the data block A is present in the storage cache 112, but a duplicate of the data is no longer present in the host cache 110. Accordingly, the data block A is now exclusively cached by the storage cache 112. Thus, a technique has been described for cache memory management using a write operation.

Figure 9:
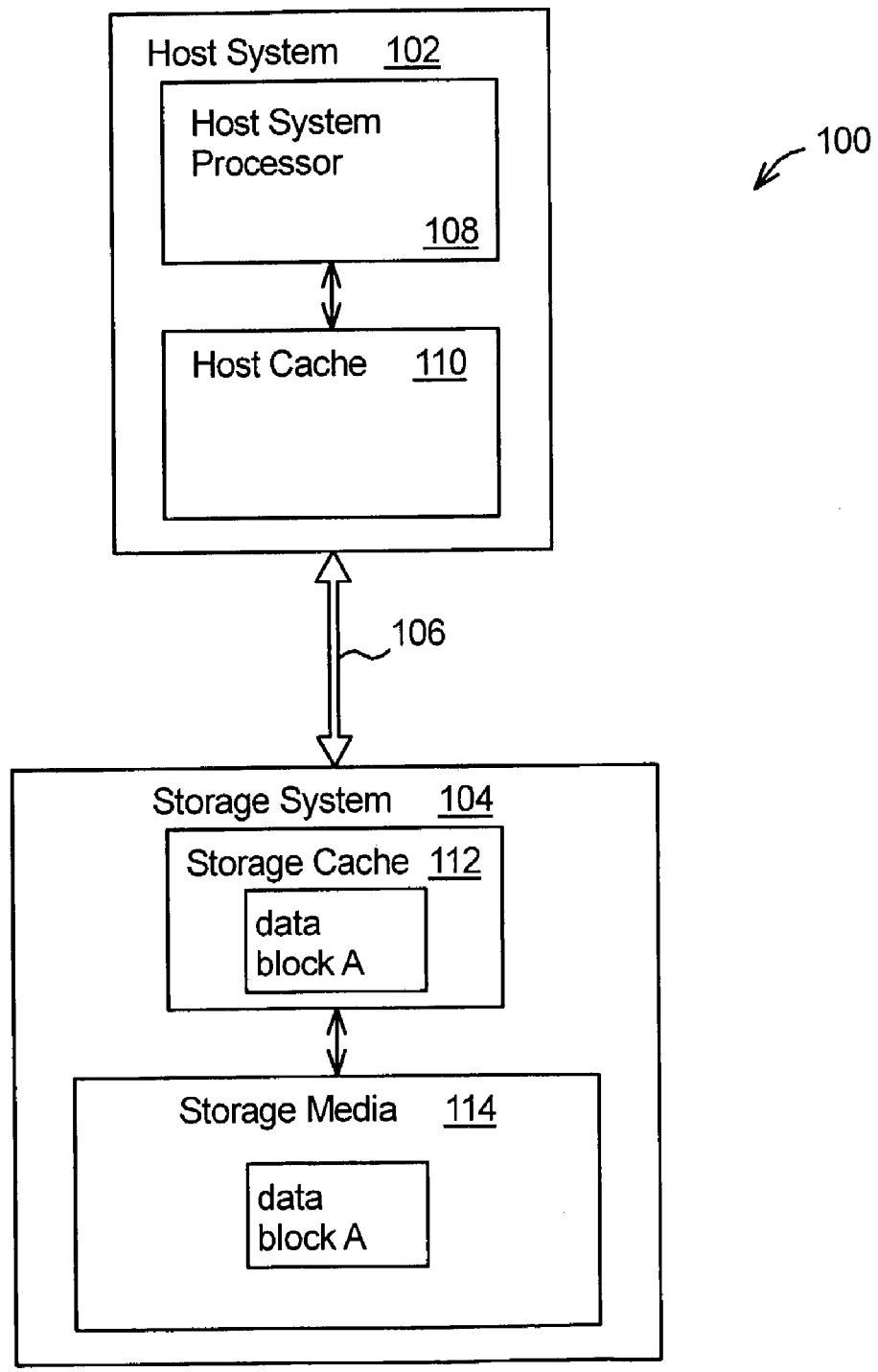
FIG. 9 illustrates the computer system in which the data block has been copied from the secondary cache memory to a storage media in accordance with an aspect of the present invention.

The write operation may include forwarding the data block A to the storage media 114. This is shown in FIG. 9, in which the data block A' in the storage media 114 is replaced by the identical data block A. This copying may be performed as a background operation when the storage system 104 is not busy with other tasks.

As mentioned, however, the data block A is not needed by the storage media since the identical data block A' is already present in the storage media 114. Accordingly, the data block A forwarded to the storage system 104 need not be copied to the storage media 114. Avoiding copying the data block to the storage media 114 may be accomplished in step 610 by having the host system 102 send an appropriate signal the storage system 104 to avoid copying the data block. However, because this signaling would likely require additional traffic via the communication path 106, it is generally preferred to allow the copying to take place, as shown in FIG. 9. Note that steps 608 and 610 can be performed in other order or concurrently.

The storage system cache 112 may be employed to hold data blocks which are obtained by read-ahead operations in the storage media 114 as well as data blocks that have been evicted by the host system 102 in accordance with the present invention. In one embodiment, data blocks which have been evicted from the host system 102 may be held in any free area of the storage system cache 112. Locations in the storage system cache 112 may be made free by eviction of the data. Alternatively, the storage of such data blocks may be limited to one or more predetermined portions of the storage system cache 112. The storage system cache 112 may also be employed to hold other data blocks from read or write operations performed by the host system 102. In addition, the storage system 104 may implement any known data block replacement policy for the storage system cache 112.

The storage system 104 may preferentially keep data blocks in the storage cache 112 that are being shared by multiple host systems that have access to the storage system 104. For example, the storage system 104 may select blocks for eviction from among the unshared data blocks only and select shared data blocks for eviction only if no unshared data blocks remain in the storage system cache 112. Alternatively, the storage system 104 may take into account the shared status of a data block as only one factor in its replacement policy with other factors being the age, time of last update, etc., for the data block. These factors may be weighted in combination.

The communication path 106 may be implemented as any type of communication path that is capable of carrying information between the host system 102 and the storage system 104. For example, the communication path 106 may include a system bus or a peripheral bus. As another example, the communication path 106 may be a network communication path or may include a combination of bus, wireless, and network elements.

While the foregoing has been with reference to particular embodiments of the invention, it will be appreciated by those skilled in the art that changes in these embodiments may be made without departing from the principles and spirit of the invention, the scope of which is defined by the appended claims.

The invention claimed is:

1. A method of cache memory management in a computer system having at least a primary cache memory, a secondary cache memory and a third storage medium, comprising:

storing data in the primary cache memory wherein a copy of the data is also stored in the third storage medium;

initiating a read operation to the third storage medium after the data is stored in the primary cache memory, thereby placing a second copy of the data into the secondary cache, the second copy obtained from the third storage medium; and evicting the data from the primary cache memory.

2. The method according to claim 1, wherein the primary cache memory is included in a host computer system.

3. The method according to claim 1, wherein the secondary cache memory and the third storage medium are included in a storage system.

4. The method according to claim 3, wherein the third storage medium comprises mass-storage.

5. The method according to claim 4, wherein the mass-storage comprises one or more hard disks.

6. The method according to claim 1, wherein the primary cache memory is included in a host computer system, the secondary cache memory and the third storage medium are included in a storage system and wherein the host computer system is coupled to the storage system via a communication path.

7. The method according to claim 1, wherein the primary cache memory is included in a host computer system, the secondary cache memory and the third storage medium are included in a storage system and the computer system includes at least one of an additional host system and storage system wherein the host computer system(s) are coupled to the storage system(s) via a communication network.

8. The method according to claim 1, wherein the primary cache memory comprises a level-one processor cache memory, the secondary cache memory comprises a level-two processor cache memory and the third storage medium comprises a processor main memory.

9. The method according to claim 1, further comprising selecting the data in the primary cache for performing the read operation according to whether the data includes metadata.

10. The method according to claim 1, further comprising selecting the data in the primary cache for performing the read operation according to whether the data is a first block of data for a file.

11. The method according to claim 1, further comprising measuring a performance parameter and wherein the method is performed selectively in response to the measured performance parameter.

12. The method according to claim 11, wherein the performance parameter includes mean access time.

13. The method according to claim 11, wherein the performance parameter includes a cache miss rate.

14. The method according to claim 11, further comprising gradually changing a proportion of data blocks that are selected for performing the read operation in response to the measured performance parameter.

15. The method according to claim 11, further comprising ceasing to select data blocks for performing the read operation in response to the measured performance parameter.

16. The method according to claim 1, further comprising copying the second copy of the data to the primary cache.

17. The method according to claim 1, further comprising avoiding copying the second copy of the data to the primary cache by aborting said read operation.

18. The method according to claim 1, wherein said initiating the read operation is performed prior to evicting the data from the primary cache memory.

19. The method according to claim 1, wherein said initiating the read operation is performed after evicting the data from the primary cache memory.

20. A method of cache memory management in a computer system having at least a primary cache memory, a secondary cache memory and a third storage medium, comprising:
   storing data in the primary cache memory wherein a copy of the data is also stored in the third storage medium;
   prior to evicting the data stored from the primary cache memory, initiating a write operation to the third storage medium, thereby placing a second copy of the data into the secondary cache memory and copying the second copy of the data to the third storage medium; and
   evicting the data from the primary cache memory.

21. The method according to claim 20, wherein the primary cache memory is included in a host computer system.

22. The method according to claim 20, wherein the secondary cache memory and the third storage medium are included in a storage system.

23. The method according to claim 22, wherein the third storage medium comprises mass-storage.

24. The method according to claim 23, wherein the mass-storage comprises one or more hard disks.

25. The method according to claim 20, wherein the primary cache memory is included in a host computer system, the secondary cache memory and the mass-storage are included in a storage system and wherein the host computer system is coupled to the storage system via a communication path.

26. The method according to claim 20, wherein the primary cache memory is included in a host computer system, the secondary cache memory and the mass-storage are included in a storage system and the computer system includes at least one of an additional host system and storage system wherein the host computer system(s) are coupled to the storage system(s) via a communication network.

27. The method according to claim 20, wherein the primary cache memory comprises a level-one processor cache memory, the secondary cache memory comprises a level-two processor cache memory and the third storage medium comprises a processor main memory.

28. The method according to claim 20, further comprising selecting the data in the primary cache for performing the write operation according to whether the data includes metadata.

29. The method according to claim 20, further comprising selecting the data in the primary cache for performing the write operation according to whether the data is a first block of data for a file.

30. The method according to claim 20, further comprising measuring a performance parameter and wherein the method is performed selectively in response to the measured performance parameter.

31. The method according to claim 30, wherein the performance parameter includes mean access time.

32. The method according to claim 30, wherein the performance parameter includes a cache miss rate.

33. The method according to claim 30, further comprising gradually changing a proportion of data blocks that are selected for performing the write operation in response to the measured performance parameter.

34. The method according to claim 30, further comprising ceasing to select data blocks for performing the write operation in response to the measured performance parameter.

35. A method of cache memory management in a computer system having at least a primary cache memory, a secondary cache memory and a third storage medium, comprising:
   storing data in the primary cache memory wherein a copy of the data is also stored in the third storage medium; and
   measuring a performance parameter of the system and, in response to the measured performance parameter, selectively performing steps of:
   prior to evicting the data from the primary cache memory, initiating a write operation to the third storage medium, thereby placing a second copy of the data into the secondary cache memory;
   avoiding copying the second copy of the data to the third storage medium; and
   evicting the data from the primary cache memory.

36. The method according to claim 35, wherein the primary cache memory is included in a host computer system.

37. The method according to claim 35, wherein the secondary cache memory and the third storage medium are included in a storage system.

38. The method according to claim 37, wherein the third storage medium comprises mass-storage.

39. The method according to claim 38, wherein the mass-storage comprises one or more hard disks.

40. The method according to claim 35, wherein the primary cache memory is included in a host computer system, the secondary cache memory and the mass-storage are included in a storage system and wherein the host computer system is coupled to the storage system via a communication path.

41. The method according to claim 35, wherein the primary cache memory is included in a host computer system, the secondary cache memory and the mass-storage are included in a storage system and the computer system includes at least one of an additional host system and storage system wherein the host computer system(s) are coupled to the storage system(s) via a communication network.

42. The method according to claim 35, wherein the performance parameter includes mean access time.

43. The method according to claim 35, wherein the performance parameter includes a cache miss rate.

44. The method according to claim 35, further comprising gradually changing a proportion of data blocks that are selected for performing the write operation in response to the measured performance parameter.

45. The method according to claim 35, further comprising ceasing to select data blocks for performing the write operation in response to the measured performance parameter.

46. A method of cache memory management in a computer system having at least a primary cache memory, a secondary cache memory and a third storage medium, wherein the primary cache memory comprises a level-one processor cache memory, the secondary cache memory comprises a level-two processor cache memory and the third storage medium comprises a processor main memory the method comprising:

storing data in the primary cache memory wherein a copy of the data is also stored in the third storage medium;

prior to evicting the data from the primary cache memory, initiating a write operation to the third storage medium, thereby placing a second copy of the data into the secondary cache memory;

avoiding copying the second copy of the data to the third storage medium; and evicting the data from the primary cache memory.

47. A method of cache memory management in a computer system having at least a primary cache memory, a secondary cache memory and a third storage medium, comprising:

selecting data stored in the primary cache memory wherein a copy of the data is also stored in the third storage medium, the data selected according to whether the data includes metadata;

prior to evicting the data from the primary cache memory, initiating a write operation to the third storage medium, thereby placing a second copy of the data into the secondary cache memory;

avoiding copying the second copy of the data to the third storage medium; and evicting the data from the primary cache memory.

48. A method of cache memory management in a computer system having at least a primary cache memory, a secondary cache memory and a third storage medium, comprising:

selecting data stored in the primary cache memory wherein a cop of the data is also stored in the third storage medium, the data selected according to whether the data is a first block of data for a file;

prior to evicting the data from the primary cache memory, initiating a write operation to the third storage medium, thereby placing a second copy of the data into the secondary cache memory;

avoiding copying the second copy of the data to the third storage medium; and evicting the data from the primary cache memory.

* * * * *

UNITED STATES PATENT AND TRADEMARK OFFICE
CERTIFICATE OF CORRECTION

PATENT NO. : 7,039,765 B1 Page 1 of 1
APPLICATION NO. : 10/324226
DATED : May 2, 2006
INVENTOR(S) : John Wilkes It is certified that error appears in the above-identified patent and that said Letters Patent is hereby corrected as shown below:

In column 11, line 42, in Claim 46, after "memory" insert -- , --.

In column 12, line 31, in Claim 48, delete "cop" and insert -- copy --, therefor.

Signed and Sealed this

Sixth Day of April, 2010

David J. Kappos
*Director of the United States Patent and Trademark Office*